(12) United States Patent
Murakoshi et al.

(10) Patent No.: US 7,447,336 B2
(45) Date of Patent: Nov. 4, 2008

(54) STROKE INFORMATION MEASURING APPARATUS AND STROKE INFORMATION MEASURING METHOD

(75) Inventors: Takahiro Murakoshi, Hamamatsu (JP); Yuuichi Kimura, Hamamatsu (JP); Takehiro Kurono, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 827 days.

(21) Appl. No.: 10/479,040

(22) PCT Filed: May 30, 2002

(86) PCT No.: PCT/JP02/05293

§ 371 (c)(1),
(2), (4) Date: May 19, 2004

(87) PCT Pub. No.: WO02/096525

PCT Pub. Date: Dec. 5, 2002

(65) Prior Publication Data

US 2004/0218786 A1    Nov. 4, 2004

(30) Foreign Application Priority Data

May 30, 2001  (JP) ............................. 2001-162648

(51) Int. Cl.
*G06K 9/00* (2006.01)
(52) U.S. Cl. .................... 382/107; 482/55; 348/169
(58) Field of Classification Search ................ 382/103, 382/106, 107, 190, 198, 291; 368/10, 113; 348/169; 482/55
See application file for complete search history.

(56) References Cited

U.S. PATENT DOCUMENTS

| | | | | |
|---|---|---|---|---|
| 5,130,955 A | * | 7/1992 | Luerker et al. | 368/3 |
| 5,864,518 A | * | 1/1999 | Geiser | 368/10 |
| 6,086,379 A | * | 7/2000 | Pendergast et al. | 434/254 |
| 6,133,838 A | * | 10/2000 | Meniere | 340/573.6 |
| 6,141,041 A | * | 10/2000 | Carlbom et al. | 348/169 |
| 6,169,966 B1 | | 1/2001 | Miura et al. | 702/142 |

FOREIGN PATENT DOCUMENTS

| | | |
|---|---|---|
| JP | 61-44977 | 11/1984 |
| JP | 60-148574 | 8/1985 |
| JP | 01-270882 | 10/1989 |
| JP | 02-235481 | 9/1990 |

(Continued)

*Primary Examiner*—Bhavesh Mehta
*Assistant Examiner*—Abolfazl Tabatabai
(74) *Attorney, Agent, or Firm*—Drinker Biddle & Reath LLP

(57) ABSTRACT

A stroke information measurement device and a stroke information measurement method, by which stroke information, such as the stroke time, stroke length, etc., of a swimming swimmer can be measured accurately and immediately, are provided. This invention's stroke information measurement device 10 is characterized in comprising: an image pickup means 12, capturing images of a swimming swimmer and outputting the image data of predetermined intervals; a front end detection means 22, detecting a front end in the direction of progress of the swimmer from an image of the body of the swimmer in each image data; and a stroke point detection part 28, detecting, from among the front ends, the front end at the timing when the swimmer is in a predetermined position in each stroke.

10 Claims, 8 Drawing Sheets

FOREIGN PATENT DOCUMENTS

| | | |
|---|---|---|
| JP | 06-174450 | 6/1994 |
| JP | 07-135586 | 5/1995 |
| JP | 07-325335 | 12/1995 |
| JP | 08-171693 | 7/1996 |
| JP | 08-317277 | 11/1996 |
| JP | 11-159173 | 6/1999 |
| JP | 11-271024 | 10/1999 |
| JP | 2000-003450 | 1/2000 |
| JP | 2000-042161 | 2/2000 |
| WO | WO 94/29670 | 12/1994 |

* cited by examiner

STROKE INFORMATION MEASURING APPARATUS AND STROKE INFORMATION MEASURING METHOD

TECHNICAL FIELD

This invention concerns a stroke information measurement device and a stroke information measurement method by which images of a swimming swimmer are captured to measure stroke information, such as the stroke time, stroke length, etc., of the swimmer.

BACKGROUND ART

In competitive swimming, the pacing of a swimmer is an important factor in improving competitiveness. Measurements of stroke information, such as the time required for one stroke in each of the swimmer's stroke (referred to hereinafter as the "stroke time"), the length advanced in one stroke (referred to hereinafter as the "stroke length"), etc., are thus demanded.

As a technique of measuring such stroke information, Japanese Unexamined Patent Publication (Tokukai) No. 2000-42161 (Reference 1) describes a technique with which an operator, while viewing the movement of a measured subject (for example, a competitive swimmer), presses a switch at each predetermined phase of a motion that is repeated by the measured subject to compute the period, etc., of the periodic motion.

Also, Japanese Unexamined Patent Publication (Tokukai) No. Hei-11-159173 (Reference 2) describes a technique of measuring stroke information by taking images of a swimming swimmer and capturing the movement of a hand of the swimmer by motion capture.

DISCLOSURE OF THE INVENTION

However, with the technique described in Reference 1, since the detection of the predetermined phase in the periodic motion of the measured subject is dependent on the operator, errors may occur in the period, etc., of the periodic motion. Especially with swimming, such errors may become large since parts of the body of a swimmer become hidden by water splashes or become submerged underwater.

Also, with the art described in Reference 2, a specific means is not disclosed for capturing and continuously extracting, by motion capture, the motions of a hand of a swimmer that becomes hidden by water splashes or becomes submerged underwater.

Though besides these techniques, there are methods of recording a swimming swimmer in a videotape and measuring the stroke information later, with this method, there is the problem that it takes time to feedback the results to the swimmer.

This invention has been made in view of such circumstances and an object thereof is to provide a stroke information measurement device and a stroke information measurement method by which stroke information, such as the stroke time, stroke length, etc., of a swimming swimmer can be measured accurately and immediately.

In order to achieve the above object, the present invention provides a stroke information measurement device comprising: image pickup means for capturing image of a swimming swimmer and outputting the image data of predetermined intervals; front end detection means for detecting a front end in the direction of progress of the swimmer from an image of the body of the swimmer in each of the image data; and stroke point detection means for detecting, from among the front ends, the front end at the timing when the swimmer is in a predetermined position in each stroke.

The strokes of all of the four modern styles (freestyle, backstroke, breaststroke, butterfly) of competitive swimming have in common the feature that one hand or both hands of a swimmer is or are extended in the direction of progress and then retracted by the sculling of water. Thus by detecting front ends in the direction of progress of a swimmer from images of the body of the swimmer and determining, from among these front ends, the front end when the swimmer is in a predetermined position in each stroke, the stroke time, stroke length, and other stroke information of the swimmer can be measured accurately and immediately.

Also, the stroke point detection means preferably detects the front end at the timing when a variation, between a first front end detected by the front end detection means and a second front end detected when the predetermined interval has elapsed after the detection of the first front end, changes from decreasing to increasing.

The detection of the front end when the swimmer is in a predetermined position in each stroke can thus be performed accurately.

Also, the front end detection means preferably comprises: discrimination means for discriminating, from within each image data output from the image pickup means, pixels that are to be candidates of the image of the body based on at least one of hue, saturation and value; and elimination means for computing the perimeter of each area formed by the pixels to be candidates of the image of the body being adjacent to each other, and eliminating the area, perimeter of which is no more than a predetermined perimeter, as noise.

Even when water splashes or reflections due to waves, etc., are judged as the pixels to be candidates of the image of the body, since these form areas that are short in perimeter in comparison to the area of the image of the body, the noise can be eliminated based on the perimeter of each area and, the front end of the image of the body can thus be detected accurately.

Also, the front end detection means preferably comprises: discrimination means for discriminating, from within each image data output from the image pickup means, pixels that are to be candidates of the image of the body based on at least one of hue, saturation and value; and extraction means for integrating the pixels to be candidates of the image of the body along at least one of the direction of progress and the direction perpendicular to the direction of progress, and extracting the area, total length of which in the direction perpendicular to the direction of the integration is the greatest, as the image of the body.

Even when a line drawn on the bottom of a pool, etc., are judged as the pixels to be candidates of the image of the body, since when the pixels to be candidates of the image of the body are integrated along at least one of the direction of progress and the direction perpendicular to the direction of progress, the area of the image of the body will be the greatest, the area of the image of the body can be extracted, and thus the front end of the image of the body can be detected accurately.

Also in order to achieve the above object, the present invention provides a stroke information measurement method comprising: image pickup step of capturing image of a swimming swimmer and outputting the image data of predetermined intervals; front end detection step of detecting a front end in the direction of progress of the swimmer from an image of the body of the swimmer in each of the image data; and stroke point detection step of detecting, from among the front ends, the front end at the timing when the swimmer is in a predetermined position in each stroke.

Also, preferably the stroke point detection step detects the front end at the timing when a variation, between a first front end detected in the front end detection step and a second front end detected when the predetermined interval has elapsed after the detection of the first front end, changes from decreasing to increasing.

Also, the front end detection step preferably comprises: discrimination step of discriminating, from within each image data output in the image pickup step, pixels that are to be candidates of the image of the body based on at least one of hue, saturation and value; and elimination step of computing the perimeter of each area formed by the pixels to be candidates of the image of the body being adjacent to each other, and eliminating the area, perimeter of which is no more than a predetermined perimeter, as noise.

Also, the front end detection step preferably comprises: discrimination step of discriminating, from within each image data output in the image pickup step, pixels that are to be candidates of the image of the body based on at least one of hue, saturation and value; and extraction step of integrating the pixels to be candidates of the image of the body along at least one of the direction of progress and the direction perpendicular to the direction of progress, and extracting the area, total length of which in the direction perpendicular to the direction of the integration is the greatest, as the image of the body.

BEST MODE FOR CARRYING OUT THE INVENTION

A favorable embodiment of the present invention shall now be described in detail along with the drawings. In the description of the drawings, the same elements shall be provided with the same symbols and redundant description shall be omitted. Also, the proportions of the drawings do not necessarily match those of the description.

Figure 1:
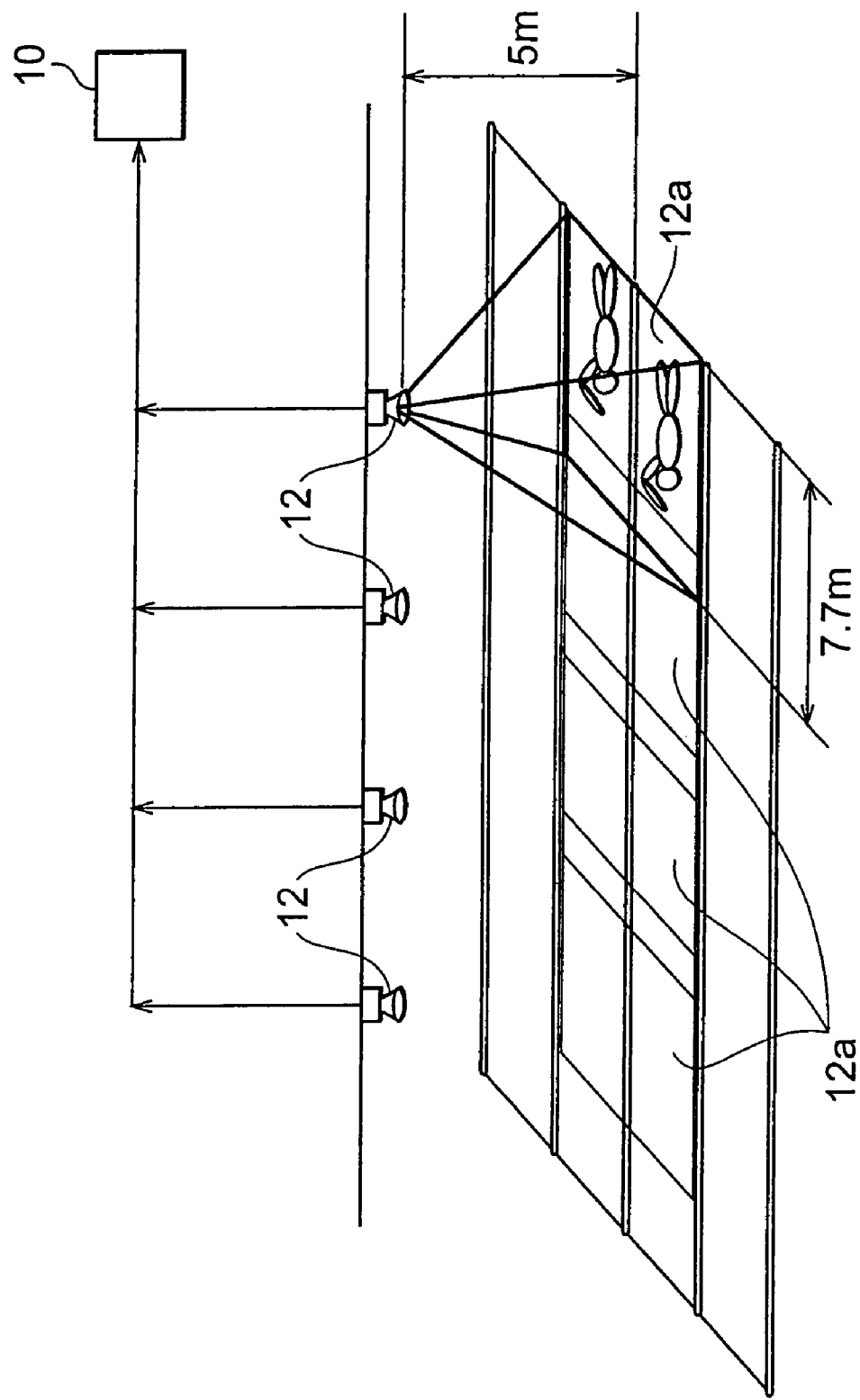
FIG. 1 is an explanatory diagram of the configuration of image pickup parts of an embodiment of the present invention.
Figure 2:
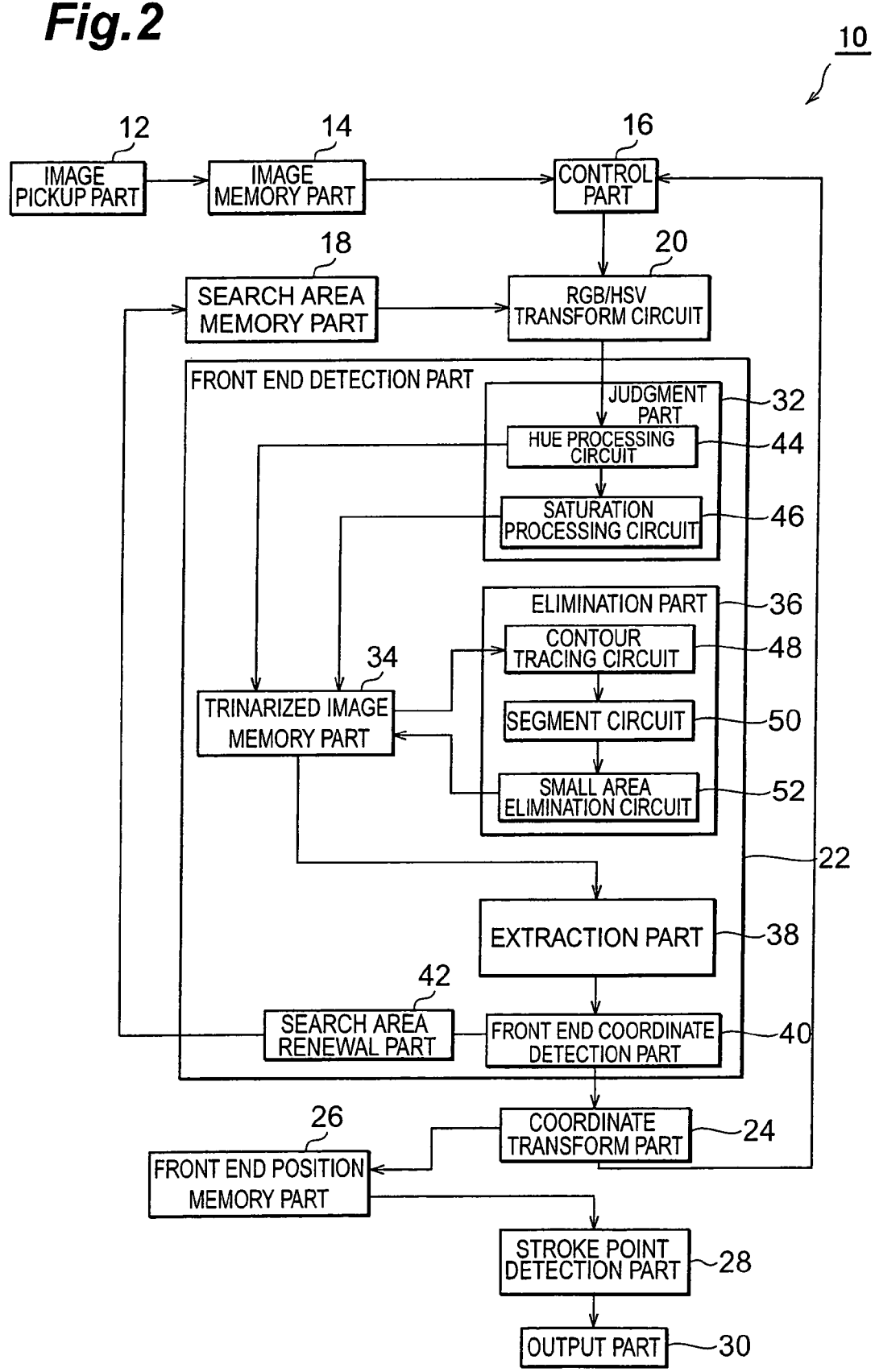
FIG. 2 is a block diagram showing the arrangement of a stroke information measurement device of the embodiment of the present invention.
Figure 3A:
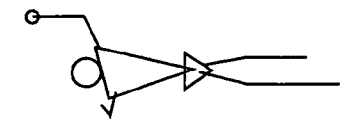
FIG. 3A is an explanatory diagram showing the position when one hand extends in the direction of progress in freestyle swimming.
Figure 3B:
FIG. 3B is an explanatory diagram showing the position when the one hand contacts water in freestyle swimming.
Figure 3C:
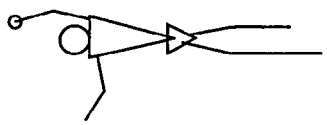
FIG. 3C is an explanatory diagram showing the position when the one hand sculls water in freestyle swimming.
Figure 3D:
FIG. 3D is an explanatory diagram showing the position when the other hand extends in the direction of progress in freestyle swimming.

FIG. 1 is an explanatory diagram of the configuration of image pickup parts 12 of a stroke information measurement device 10 of an embodiment of the present invention, and FIG. 2 is a block diagram showing the arrangement of stroke information measurement device 10.

As shown in FIG. 1, stroke information measurement device 10 is for processing image data output from image pickup parts 12 (image pickup means) and measuring stroke information, such as the stroke time, stroke length, etc. An image pickup part 12 is a fixed camera that is installed on a ceiling and plurality of such units are installed at equal intervals along the direction of a lane of a pool so that images of a swimming swimmer can be taken continuously.

As shown in FIG. 2, stroke information measurement device 10 is equipped with image pickup parts 12, each of which outputs the captured image data according to frame (in other words, every 1/30 seconds), an image memory part 14, which stores the output image data, a control part 16, which controls the timing of processing of the image data in image memory part 14, a search area memory part 18, which stores search areas in the respective image data in which the image of the body of the swimmer is presumed to exist, and an RGB/HSV (Red, Green, Blue/Hue, Saturation, Value) transform circuit 20, which, for pixels within the search area set for each image data, detects the respective values of hue, saturation, and value.

Furthermore, stroke information measurement device 10 is equipped with a front end detection part 22 (front end detection means), which trinarizes the pixels within a search area of image data based on the hue and saturation detected by RGB/HSV transform circuit 20 and detects, from the image of the body of the swimmer, the coordinate of the front end in the direction of progress of the swimmer in the image data, a coordinate transform part 24, which transforms the coordinates of the front end in the image data to an actual position (referred to hereinafter as "actual position"), a front end position memory part 26, which stores each actual position obtained by the transformation according to frame, a stroke point detection part 28 (stroke point detection means), which detects, from the actual position of each front end in front end position memory part 26, the actual position and time of the front end when the swimmer has reached a predetermined position in each stroke as the stroke point, and an output part 30, which outputs the detected stroke point, etc.

The respective arrangements of the abovementioned image pickup part 12, control part 16, search area memory part 18, coordinate transform part 24, stroke point detection part 28, and front end detection part 22 shall now be described in detail.

Each image pickup part 12 performs DMA (Direct Memory Access) transfer of image data to image memory part 14 along with a synchronization signal for each frame (that is, every 1/30 seconds) when even a part of a search area in a lane exists within a corresponding image pickup range 12a. As shown in FIG. 1, each image pickup part 12 is installed on the ceiling of the pool at a distance of 5 m from the water surface and the image pickup range 12a thereof covers two lanes and is 7.7 m long in the direction of the lane of the pool. A wide conversion lens with a magnification of 0.6 is fitted on to each image pickup part 12. As the video signal, an NTSC (National Television System Committee) composite video signal is used and the size of the image data is 640×480 pixels of 24 bits RGB.

Control part 16 monitors the circumstances of intake of the image data into image memory part 14 and when the intake is completed, makes RGB/HSV transform circuit 20 start the processing of the image data of the next frame on the basis of a signal indicating the end of processing from coordinate transform part 24.

Search area memory part 18 stores, for each lane, an area in each image data, in which the image of the body of a swimmer is presumed to exist, as the search area. For the search area, a rectangular area that is 50 pixels long in the direction of progress from a point immediately after the starting platform and 200 pixels long in the direction perpendicular to the direction of progress (corresponding to the number of pixels at the inner sides of the lane ropes of each lane) is used as an initial area and renewal is performed in accordance with the progress of the swimmer and is performed for each lane. The renewal of the search area shall be described later.

Coordinate transform part 24 performs correction of barrel distortion due to the use of the wide conversion lens in each image pickup part 12 and converts the coordinates in the image data of the front end detected by front end detection part 22 to an actual position based on the position and zooming conditions of image pickup part 12. With the present embodiment, the actual position is the distance along the direction of progress from the starting platform and is converted using the conditions of 1.2 cm per pixel.

Stroke point detection part 28 detects, from among the actual front end positions stored in front end position memory part 26, the actual position and time of the front end, when the displacement of the actual front end positions between continuous frames (that is, before and after the elapse of 1/30 seconds) changes from decreasing to increasing, as the stroke point.

Figure 4:
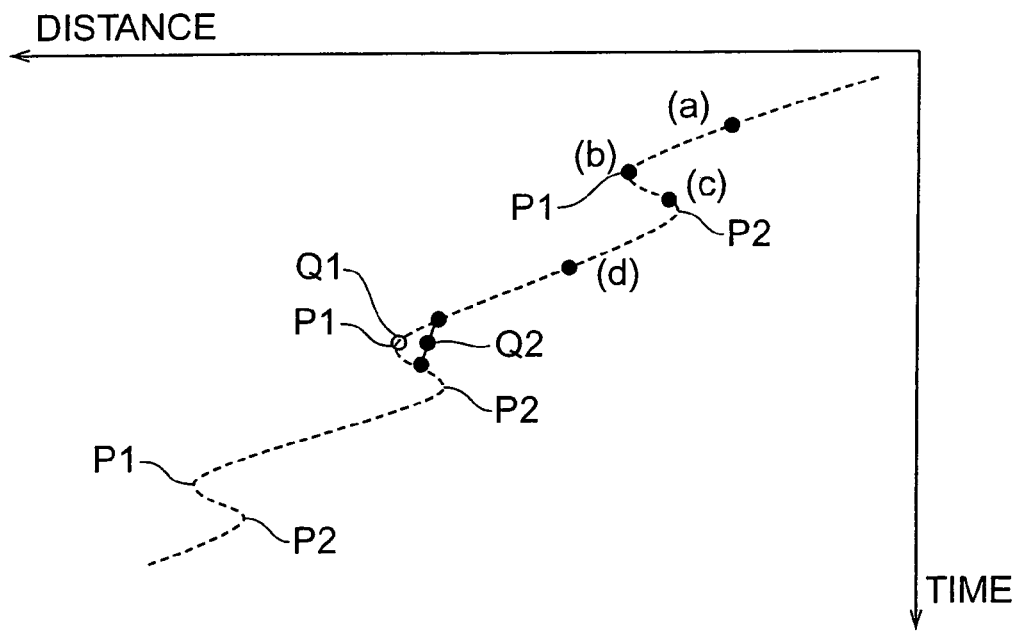
FIG. 4 is a time distance map showing the positions of a front end of the body of a swimmer in freestyle swimming.

The principles of stroke point detection in the present invention makes use of the feature common to all of the four modern styles of competitive swimming (freestyle, backstroke, breaststroke, butterfly) that one hand or both hands of a swimmer is or are extended in the direction of progress and then retracted by the sculling of water. FIG. 3 show explanatory diagrams of the movements of freestyle swimming. As illustrated, with freestyle, a movement, in which one hand extends in the direction of progress (FIG. 3A), contacts water (FIG. 3B), sculls water (FIG. 3C), and then the other hand extends in the direction of progress (FIG. 3D), is repeated. Thus when as shown in FIG. 4, the position (for example, the distance along the direction of progress from the starting platform) of the front end of the body of a swimmer is plotted in a time distance map having time as the ordinate and distance as the abscissa, local maximum P1 and local minimum P2 appear in correspondence to the respective strokes. (a), (b), (c), and (d) in the time distance map of FIG. 4 correspond to the positions of the front end of the swimmer in the respective positions shown in FIGS. 3A, 3B, 3C, and 3D. A local maximum P1 corresponds to a position in which one hand contacts water and a local minimum P2 corresponds to a position in which the one hand finishes sculling water. Thus by detecting the position and time of the front end when the swimmer reaches a predetermined position in each stroke motion as the stroke point, stroke information, such as the stroke time, stroke length, etc., of the swimmer can be measured accurately and immediately.

Figure 5:
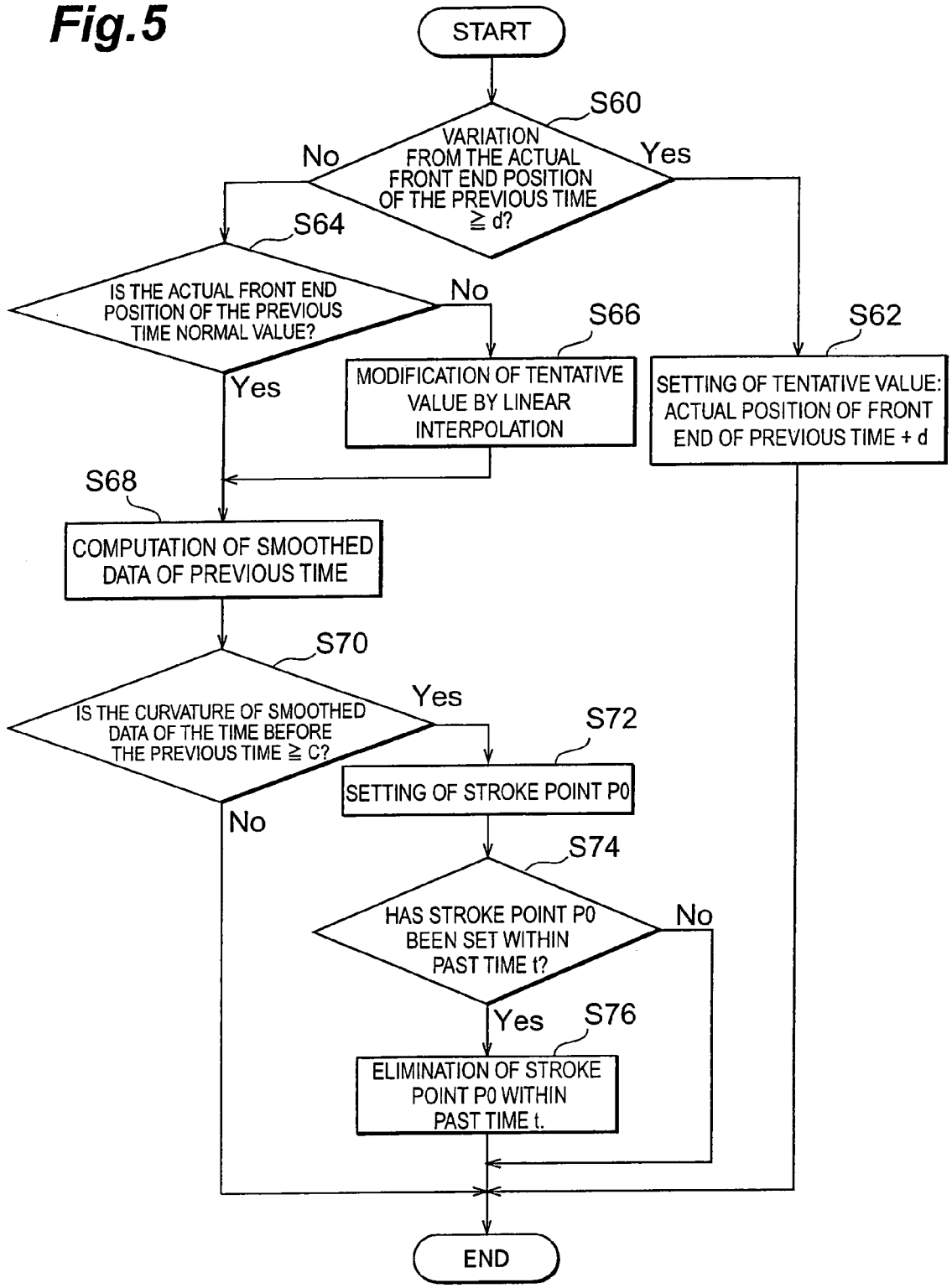
FIG. 5 is a flowchart illustrating a stroke point detection process by a stroke point detection part of the embodiment according to the present invention.

FIG. 5 is a flowchart illustrating a process of detection of a stroke point P0 by stroke point detection part 28. First, it is judged whether or not the actual front end position is displaced by a threshold value d or more from the actual front end position in the previous frame (step 60). This threshold value d is set to a swimming velocity that cannot be realized as a movement of the swimmer and, in the present embodiment, it is set to 4.5 m/second. If the displacement amount is greater than or equal to threshold value d, the actual front end position is set, as a tentative value, to the actual front end position in the previous frame+threshold value d (step 62) and the process is ended without the setting of stroke point P0. If the displacement amount is less than threshold value d, the actual front end position is deemed to be a normal value and it is judged whether or not the actual front end position in the previous frame was a normal value (step 64).

If the value is not a normal value, that is, if the value is a tentative value, linear interpolation is performed from an actual front end position that was judged to be a normal value to the present actual front end position to modify the tentative value (step 66) and a transfer to step 68 is performed. For example, when as shown in FIG. 4, Q1 is a tentative value, interpolation by a straight line is performed between the prior and subsequent normal values and Q1 is modified to Q2 on this straight line. If the value for the previous frame is a normal value, a smoothed data for the previous time is computed based on the actual front end positions of the previous time and of the pre-previous time (step 68). It is then judged whether or not the curvature of the smoothed data of the pre-previous time with respect to prior and subsequent data is equal to or greater than a threshold value c (step 70).

If the curvature is less than threshold value c, the process is ended without stroke point P0 being set. If the curvature is equal to or greater than threshold value c, stroke point P0 is set (step 72) and it is judged whether or not stroke point P0 has been set within a past time t (step 74). In the present embodiment, this time t is set to 450 milliseconds. If stroke point P0 has not been set within past time t, the process is ended. If stroke point P0 has been set within past time t, the stroke point P0 within the past time t is eliminated (step 76) and the process is ended.

Stroke point detection part 28 thus detects, as stroke point P0, the actual position and time of the front end when, based on curvature, the displacement amount of the actual front end position changes from decreasing to increasing, that is, when the swimmer reaches the position in which the sculling of water is ended in each stroke. In comparison to the position in which the sculling of water by one hand is ended, with the position in which one hand contacts water, the influence of water splashes, etc., is large and errors may occur in the coordinates of the front end that are detected by front end detection part 22. Thus by detecting the actual position and time of the front end when the swimmer reaches the position in which the sculling of water is ended in each stroke as stroke point P0, stroke information, such as the stroke time, stroke length, etc., of the swimmer can be measured more accurately.

As shown in FIG. 2, front end detection part 22 is equipped with a discrimination part 32 (discrimination means), which trinarizes the pixels within a search area of the image data based on the hue and saturation, among the hue, saturation, and value detected by RGB/HSV transform circuit 20, a trinarized image memory part 34, which stores the trinarized image data, and an elimination part 36 (elimination means), which eliminates noise from the trinarized data in trinarized image memory part 34.

Furthermore, front end detection part 22 is equipped with an extraction part 38 (extraction means), which extracts, as an image of the body, an area (referred to hereinafter as the "body area") that contains the image of the body from the trinarized image data from which noise has been eliminated by elimination part 36, a front end coordinate detection part 40, which detects, from the extracted body area, the front end in the direction of progress of the swimmer as coordinates in the image data, and a search area renewal part 42, which renews the search area according to each lane and outputs the new search area as the search area in the image data of the next frame to search area memory part 18.

The respective arrangements of the abovementioned judgment part 32, elimination part 36, extraction part 38, front end coordinate detection part 40, and search area renewal part 42 shall now be described in detail.

Discrimination part 32 discriminates pixels that are to be candidates of the image of the body of the swimmer by means of a hue processing circuit 44 and a saturation processing circuit 46. Hue processing circuit 44 discriminates pixels with which the hue values are clearly not those of the pool as pixels to be first candidates of the image of the body (referred to hereinafter as "first body candidate pixels"). With the present embodiment, pixels of a hue value of 180° to 260° in a standard color wheel are deemed to be the first body candidate pixels. Saturation processing circuit 46 discriminates, from among pixels besides the first body candidate pixels, pixels of low saturation as pixels that are to be second candidates of the image of the body (referred to hereinafter as "second body candidate pixels"). With this embodiment, pixels of a saturation of less than 10% are deemed to be the second body candidate pixels. Discrimination part 32 thus discriminates all pixels within a search area into the three values of first body candidate pixels, second body candidate pixels, and other pixels (referred to hereinafter as "background pixels") and stores the trinarized image data in trinarized image memory part 34.

Elimination part 36 eliminates noise from the trinarized image data stored in trinarized image memory part 34 by means of a contour tracing circuit 48, a segment circuit 50, and a small area elimination circuit 52. Contour tracing circuit 48 performs tracing of the contours of the first body candidate pixels and the second body candidate pixels and, for each area formed by the first body candidate pixels and second body candidate pixels being adjacent to each other, determines the perimeter of the area. Segment circuit 50 performs a segment process on each of the formed areas and small area elimination circuit 52 eliminates, as noise, areas with which the area perimeter computed by contour tracing circuit 48 is less than or equal to a predetermined perimeter.

Thus by elimination part 36, even if water splashes, reflections due to waves, etc., are judged as pixels to be candidates of the image of the body, that is, as first body candidate pixels or as second body candidate pixels, since areas formed by such water splashes, reflections due to waves, etc., are short in perimeter in comparison to areas that contain the image of the body, noise can be eliminated based on the perimeter of each area.

Figure 6:
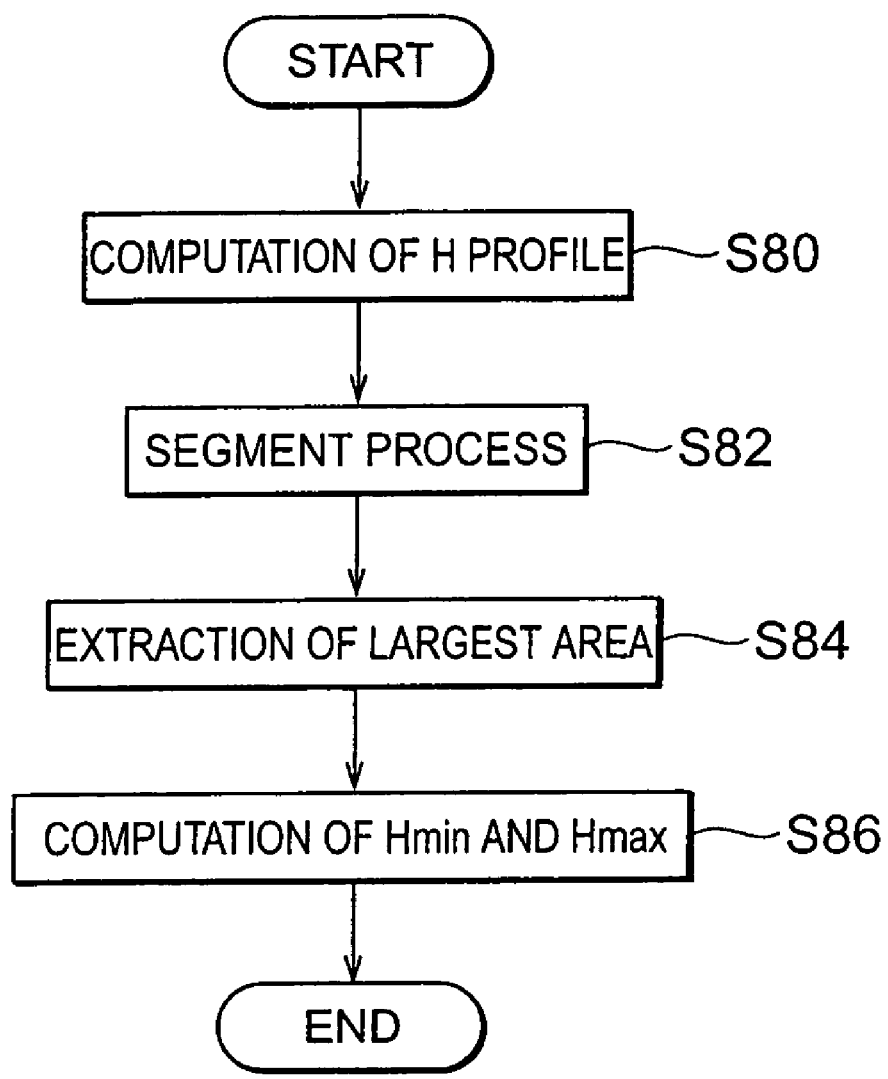
FIG. 6 is a flowchart illustrating an extraction process by an extraction part of the embodiment according to the present invention.
Figure 7:
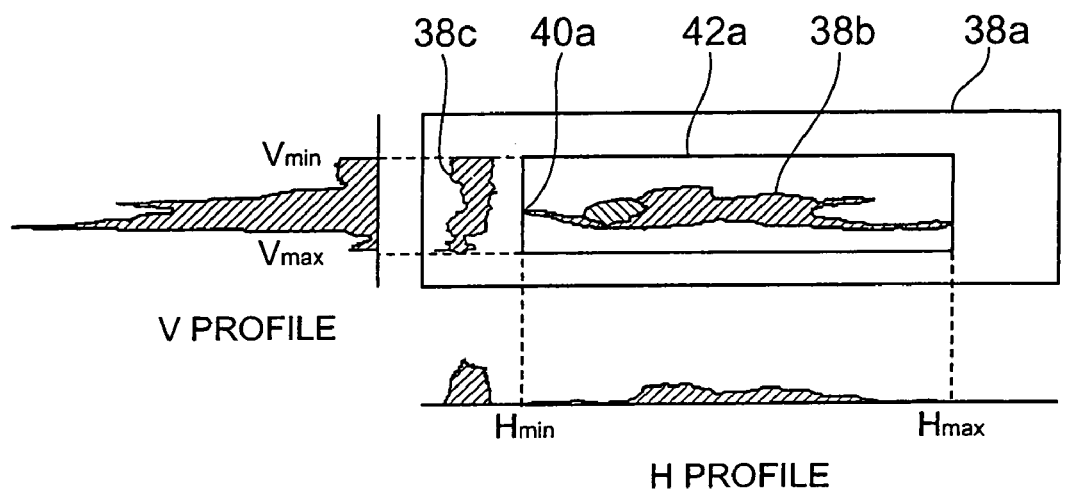
FIG. 7 is an explanatory diagram of profile data of the embodiment according to the present invention.

Extraction part 38 extracts the body area as the image of the body. FIG. 6 is a flowchart illustrating a process of extraction in the direction perpendicular to the direction of progress by extraction part 38. FIG. 7 is an explanatory diagram of profile data. A case where a body area 38b, which is an area formed from first body candidate pixels and second body candidate pixels, and an area 38c due to a line drawn on the bottom of the pool at the direction of progress side of body area 38b, exist in a search area 38a as shown in FIG. 7 shall now be described.

As shown in FIG. 6 and FIG. 7, extraction part 38 performs integration of the first body candidate pixels and second body candidate pixels inside search area 38a in the direction perpendicular to the direction of progress of the swimmer and computes a one-dimensional H profile data along the direction of progress (step 80). A segment process is then performed on each area formed by the integration (step 82) and the area corresponding to the area, total length of which in the direction of progress is the greatest, is extracted as body area 38b (step 84). Hmin and Hmax, which define the range of the greatest area among the H profile data are then computed (step 86).

Thus with extraction part 38, even if a line drawn on the bottom of the pool, etc., is discriminated as pixels to be candidates of the body, that is, as first body candidate pixels or second body candidate pixels, since when the first body candidate pixels and second body candidate pixels are integrated along the direction perpendicular to the direction of progress of the swimmer, body area 38b becomes the largest area, body area 38b can be extracted as the image of the body.

Also as shown in FIG. 7, with regard to the direction of progress, by simply changing the direction of integration of the first body candidate pixels and the second body candidate pixels to the direction of progress and performing the same other processing steps as the above-described extraction process in the direction perpendicular to the direction of progress, one-dimensional V profile data along the direction perpendicular to the direction of progress are prepared and Vmin and Vmax, which define the range of the greatest area among the V profile data, are computed. In the case of butterfly, breaststroke, etc., the stroke point can also be detected based on the variation in the range of the largest area among the V profile data.

As shown in FIG. 7, front end coordinate detection part 40 detects, as coordinates inside the image data, a front end 40a in the direction of progress of the swimmer from body area 38b extracted by extraction part 38. If a plurality of pixels that are edges in the direction of progress exist along the direction perpendicular to the direction of progress in body area 38b, the coordinate in the direction perpendicular to the direction of progress is set to the average value for these pixels.

Figure 8:
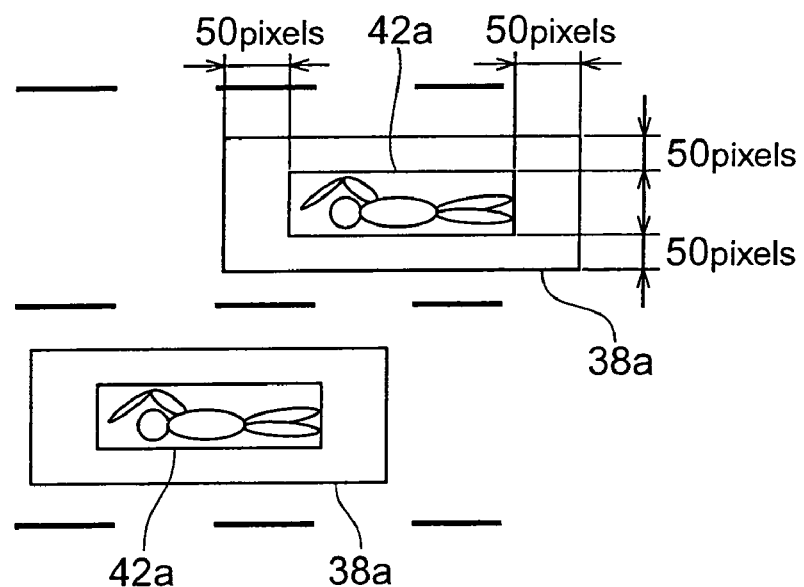
FIG. 8 is an explanatory diagram of the renewal of a search area in the embodiment according to the present invention.

Search area renewal part 42 performs the renewal of search area 38a for each lane and outputs the new area as search area 38a in the image data of the next frame to search area memory part 18. FIG. 8 is an explanatory diagram of the renewal of a search area. As illustrated, a rectangular zone, formed by adding 50 pixels respectively to the surroundings of a rectangular area 42a, which is surrounded by Hmin and Hmax that define the range of the largest area in the H profile data computed by extraction part 38 and by Vmin and Vmax that define the range of the largest area in the V profile data computed by extraction part 38, is set as search area 38a of the image data of the next frame.

Figure 9:
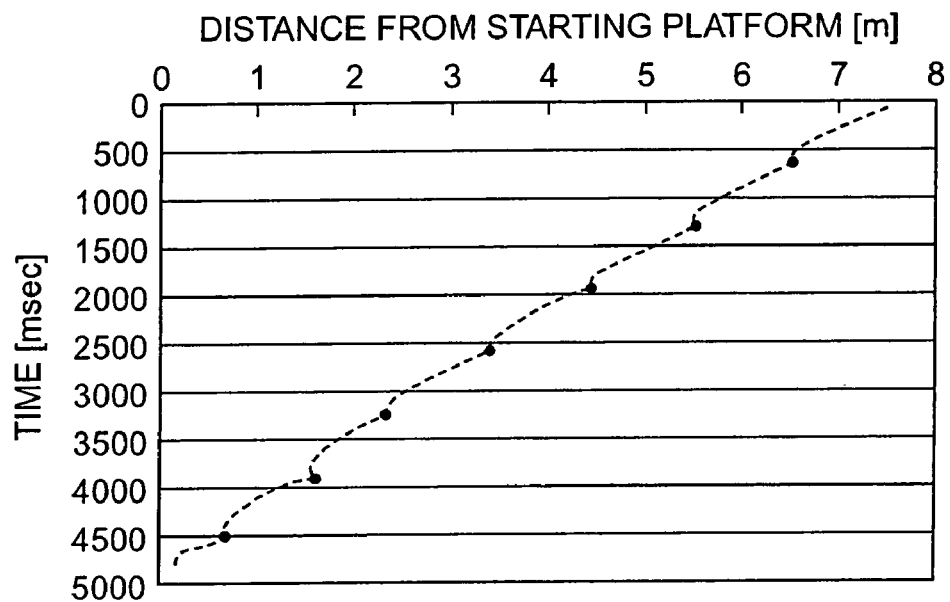
FIG. 9 is a time distance map showing the transition of the actual position of a front end and the stroke point detection results for freestyle swimming.
Figure 10:
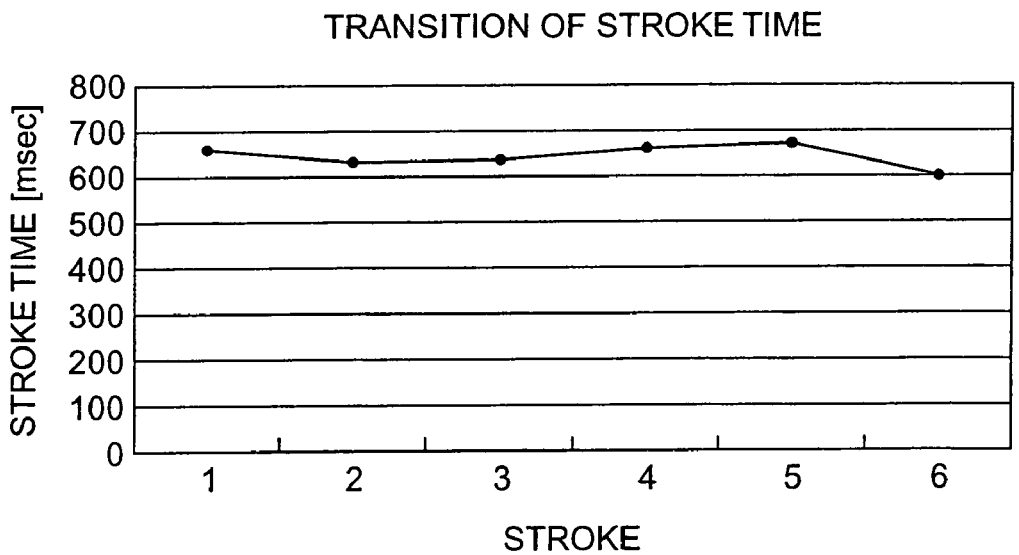
FIG. 10 is a graph showing the transition of the stroke time in FIG. 9.
Figure 11:
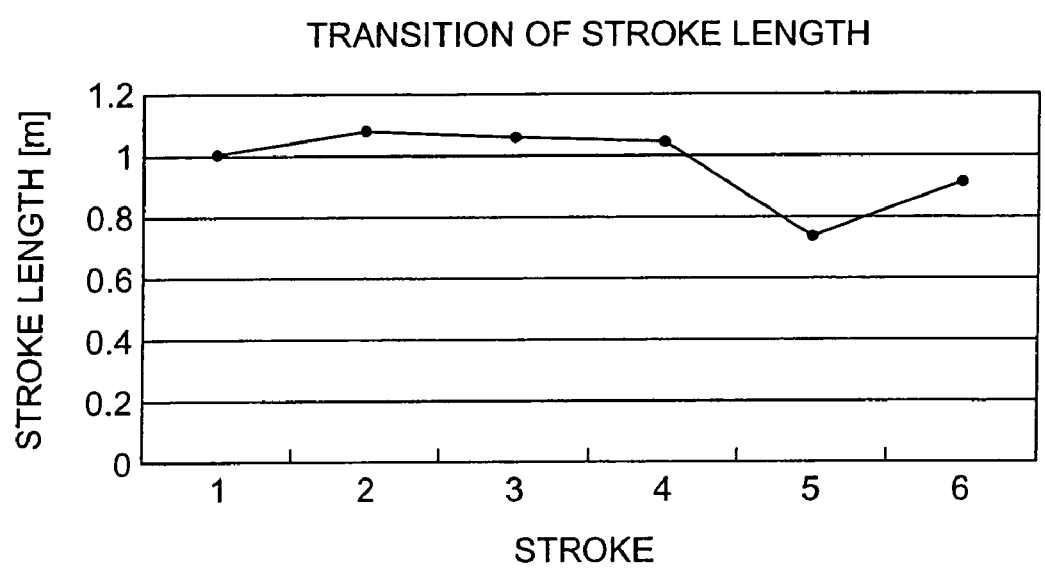
FIG. 11 is a graph showing the transition of the stroke length in FIG. 9.

By stroke point measurement device 10 of the above-described arrangement, stroke point P0, etc., such as shown in FIG. 9, can be obtained from output part 30. FIG. 9 is a time distance map showing the transition of the actual front end position and the results of detection of stroke point P0 for freestyle swimming. The data shown in FIG. 9 are data for when a swimmer is swimming towards a starting platform. Based on the detected stroke point P0, the stroke time, stroke length, and other stroke information of the swimmer can be measured accurately and immediately as shown in FIG. 10 and FIG. 11. FIG. 10 is a graph showing the transition of the stroke time in FIG. 9. FIG. 11 is a graph showing the transition of the stroke length in FIG. 9.

The operations of stroke information measurement device 10 shall now be described and the stroke information measurement method of the embodiment according to the present invention shall be described in accompaniment. Needless to say, the present invention's stroke information measurement method is not limited to a case where stroke information measurement device 10 is used.

First, image data of a swimming swimmer taken by image pickup part 12 are output for each frame (that is, every 1/30 seconds) and stored in image memory part 14. Based on a signal indicating the start of processing from control part 16, RGB/HSV transform circuit 20 detects the respective degrees of hue, saturation, and value of the pixels in the image data for a search area set by search area memory part 18 and outputs the degrees to discrimination part 32 of front end detection part 22.

At discrimination part 32, the first body candidate pixels are discriminated by hue processing circuit 44, the second body candidate pixels are discriminated by saturation processing circuit 46, all pixels inside the search area are thus discriminated in the form of the three values of the first body candidate pixels, second body candidate pixels, and background pixels, and the trinarized image data are stored in trinarized image memory part 34.

In elimination part 36, contour tracing circuit 48 performs contour tracing on the first body candidate pixels and the second body candidate pixels of the trinarized image data in trinarized image memory part 34 and, for each area formed by the first body candidate pixels and second body candidate pixels being adjacent to each other, the perimeter of the area is computed. A segment process is then carried out on each of the formed areas by segment circuit 50 and areas with which the perimeter computed by contour tracing circuit 48 is less than or equal to a predetermined perimeter are eliminated as noise.

After elimination of noise by elimination part 36, body area 38b is extracted at extraction part 38 as the image of the body from the trinarized image data. At the same time, Hmin and Hmax, which define the range of the largest area in the H profile data, and Vmin and Vmax, which define the range of the largest area in the V profile data, are computed.

Front end 40a in the direction of progress of the swimmer is then detected by front end coordinate detection part 40 as coordinates in the image data from body area 38b that has been extracted at extraction part 38. Search area 38a is then renewed according to each lane by search area renewal part 42 and the new search area is stored as search area 38a in the image data of the next frame in search area memory part 18.

The coordinates of front end 40a in the image data that have been detected at front end coordinate detection part 40 are then converted to an actual position by coordinate transform part 24 and these coordinates are stored in front end position memory part 26 for each frame (that is, every 1/30 seconds). Stroke point detection part 28 then detects, based on curvature, stroke point P0 as the actual position and time of the front end when the displacement between the actual front end positions of continuous frames (that is, before and after the elapse of 1/30 seconds), stored in front end position memory 26, changes from decreasing to increasing, and stroke point P0, etc., are output from output part 30.

Though an embodiment of the present invention has been described in detail above, needless to say the present invention is not limited to the above-described embodiment.

Though with this embodiment, the stroke point was detected by stroke point detection part 28 based on curvature, a plurality of periods may be set in the waveform of the actual front end position shown in FIG. 9 and the period interval (in other words, the stroke point) of each period may be computed by a Fourier analysis method. The period interval of the abovementioned waveform may also be computed using a neural net or other learning type model.

Also, though with this embodiment, a case where the image pickup part is arranged as a plurality of fixed cameras installed on the ceiling of a pool was described, the image pickup part may be arranged instead as a plurality of fixed cameras installed at the poolside or underwater, as a camera that is movable in the lane direction along a rail installed at the poolside, etc., as a camera installed on an universal head, or any other arrangement by which images of a swimming swimmer can be taken in a continuous manner. In a case where images are taken from the side, such as from the poolside, since both hands are continuously submerged underwater for breaststroke, the head of a swimmer is detected as the front end of the swimmer in the direction of progress from the image of the body of the swimmer. The stroke point can be detected since, with the breaststroke, the swimmer's head also exhibits a periodic movement with each stroke. Also in a case where a camera that is installed underwater is used, the detection of the stroke point can be performed in likewise manner by elimination of noise due to bubbles, etc.

INDUSTRIAL APPLICABILITY

As described above, with the present invention, a feature that is common to all of the four modern styles of competitive swimming (freestyle, backstroke, breaststroke, butterfly), in other words, the feature that one hand or both hands of a swimmer is or are extended in the direction of progress and then retracted by the sculling of water is used to detect the front end in the direction of progress of a swimmer from an image of the body of the swimmer and by determining, from among such front ends, the front end when the swimmer is in a predetermined position in each stroke, the stroke time, stroke length, and other stroke information of the swimmer can be measured accurately and immediately.

Also, since the front end in the direction of progress of the body of the swimmer is detected, the swimming speed, the lap times for specific distances, etc., can also be computed in a synchronized manner. Also, since based on the swimming form of each swimmer, the positional relationship between the front end of the body and an arbitrary other part of the swimmer is fixed, the swimming speed, etc., at an arbitrary part of the body such as the swimmer's waist, etc., can be computed as well. With these data, comparison with past data and with data of other swimmers can be performed readily and application to an analysis system is also enabled.

Furthermore, target values of the stroke time, stroke length, etc., can be set and the difference with respect to a measured value can be notified to a swimming swimmer by means of sound, light, etc. This enables the swimmer to physically sense the difference while swimming and make modifications, thus enabling the competitive strength of the swimmer to be improved efficiently.

The invention claimed is:

1. A stroke information measurement device comprising:

image pickup means for capturing image of a swimming swimmer and outputting the image data of predetermined intervals;

front end detection means for detecting a front end in the direction of progress of said swimmer from an image of the body of said swimmer in each of said image data; and stroke point detection means for detecting, from among said front ends, the front end at the timing when said swimmer is in a predetermined position in each stroke wherein said front end detection means comprises:

discrimination means for discriminating, from within each image data output from said image pickup means, pixels that are to be candidates of said image of the body based on at least one of hue, saturation and value; and elimination means for computing the perimeter of each area formed by said pixels to be candidates of the image of the body being adjacent to each other, and eliminating the area, perimeter of which is no more than a predetermined perimeter, as noise.

2. The stroke information measurement device as set forth in claim 1, wherein said stroke point detection means detects the front end at the timing when a variation, between a first front end detected by said front end detection means and a second front end detected when said predetermined interval has elapsed after the detection of said first front end, changes from decreasing to increasing.

3. The stroke information measurement device as set forth in claim 2, wherein said front end detection means comprises:

discrimination means for discriminating, from within each image data output from said image pickup means, pixels that are to be candidates of said image of the body based on at least one of hue, saturation and value; and elimination means for computing the perimeter of each area formed by said pixels to be candidates of the image of the body being adjacent to each other, and eliminating the area, perimeter of which is no more than a predetermined perimeter, as noise.

4. The stroke information measurement device as set forth in claim 2, wherein said front end detection means comprises:

discrimination means for discriminating, from within each image data output from said image pickup means, pixels that are to be candidates of said image of the body based on at least one of hue, saturation and value; and extraction means for integrating said pixels to be candidates of the image of the body along at least one of said direction of progress and the direction perpendicular to said direction of progress, and extracting the area, total length of which in the direction perpendicular to the direction of said integration is the greatest, as said image of the body.

5. The stroke information measurement device as set forth in claim 1, wherein said front end detection means comprises:

discrimination means for discriminating, from within each image data output from said image pickup means, pixels that are to be candidates of said image of the body based on at least one of hue, saturation and value; and extraction means for integrating said pixels to be candidates of the image of the body along at least one of said direction of progress and the direction perpendicular to said direction of progress, and extracting the area, total length of which in the direction perpendicular to the direction of said integration is the greatest, as said image of the body.

6. A stroke information measurement method comprising:

image pickup step of capturing image of a swimming swimmer and outputting the image data of predetermined intervals;

front end detection step of detecting a front end in the direction of progress of said swimmer from an image of the body of said swimmer in each of said image data; and stroke point detection step of detecting, from among said front ends, the front end at the timing when said swimmer is in a predetermined position in each stroke wherein said front end detection step comprises:

discrimination step of discriminating, from within each image data output in said image pickup step, pixels that are to be candidates of said image of the body based on at least one of hue, saturation and value; and elimination step of computing the perimeter of each area formed by said pixels to be candidates of the image of the body being adjacent to each other, and eliminating the area, perimeter of which is no more than a predetermined perimeter, as noise.

7. The stroke information measurement method as set forth in claim 6, wherein said stroke point detection step detects the front end at the timing when a variation, between a first front end detected in said front end detection step and a second front end detected when said predetermined interval has elapsed after the detection of said first front end, changes from decreasing to increasing.

8. The stroke information measurement method as set forth in claim 7, wherein said front end detection step comprises:

discrimination step of discriminating, from within each image data output in said image pickup step, pixels that are to be candidates of said image of the body based on at least one of hue, saturation and value; and elimination step of computing the perimeter of each area formed by said pixels to be candidates of the image of the body being adjacent to each other, and eliminating the area, perimeter of which is no more than a predetermined perimeter, as noise.

9. The stroke information measurement method as set forth in claim 7, wherein said front end detection step comprises:

discrimination step of discriminating, from within each image data output in said image pickup step, pixels that are to be candidates of said image of the body based on at least one of hue, saturation and value; and extraction step of integrating said pixels to be candidates of the image of the body along at least one of said direction of progress and the direction perpendicular to said direction of progress, and extracting the area, total length of which in the direction perpendicular to the direction of said integration is the greatest, as said image of the body.

10. The stroke information measurement method as set forth in claim 6, wherein said front end detection step comprises:

discrimination step of discriminating, from within each image data output in said image pickup step, pixels that are to be candidates of said image of the body based on at least one of hue, saturation and value; and extraction step of integrating said pixels to be candidates of the image of the body along at least one of said direction of progress and the direction perpendicular to said direction of progress, and extracting the area, total length of which in the direction perpendicular to the direction of said integration is the greatest, as said image of the body.

* * * * *